United States Patent [19]
Thomas

[11] Patent Number: 5,320,534
[45] Date of Patent: Jun. 14, 1994

[54] HELMET MOUNTED AREA OF INTEREST (HMAOI) FOR THE DISPLAY FOR ADVANCED RESEARCH AND TRAINING (DART)

[75] Inventor: Melvin L. Thomas, Phoenix, Ariz.

[73] Assignee: The United States of America as represented by the Secretary of the Air Force, Wright-Patterson Air Force Base, Ohio

[21] Appl. No.: 927,574

[22] Filed: Aug. 10, 1992

Related U.S. Application Data

[63] Continuation-in-part of Ser. No. 609,295, Nov. 5, 1990, Pat. No. 5,137,450.

[51] Int. Cl.$^5$ .......................... G09B 9/08; G09B 19/16
[52] U.S. Cl. .......................... 434/44; 434/38; 273/434; 345/8; 348/115; 348/121
[58] Field of Search .................. 434/21, 24, 29, 30, 434/35, 38, 43, 44, 219, 220, 307, 322, 336, 350, 365, 372; 273/85 G, 434, DIG. 28; 358/93, 104, 183, 226, 229, 241, 254; 364/424.06, 578; 340/705; 345/7-9

[56] References Cited

U.S. PATENT DOCUMENTS

| | | | |
|---|---|---|---|
| 3,514,871 | 5/1967 | Tucker | 434/44 |
| 4,028,725 | 6/1977 | Lewis . | |
| 4,315,241 | 2/1982 | Spooner . | |
| 4,340,878 | 7/1982 | Spooner et al. . | |
| 4,347,507 | 8/1982 | Spooner . | |
| 4,348,186 | 9/1982 | Harvey et al. . | |
| 4,479,784 | 10/1984 | Mallinson et al. . | |
| 4,588,382 | 5/1986 | Peters . | |
| 4,634,384 | 1/1987 | Newes et al. | 434/44 |
| 4,641,255 | 2/1987 | Hohmann | 358/104 X |
| 4,768,028 | 8/1988 | Blackie | 340/705 |
| 5,136,675 | 8/1992 | Hodson | 434/44 X |
| 5,137,450 | 8/1992 | Thomas | 358/104 X |
| 5,210,626 | 5/1993 | Kumayama et al. | 340/705 X |

Primary Examiner—Richard J. Apley
Assistant Examiner—Joe H. Cheng
Attorney, Agent, or Firm—Fredric L. Sinder; Thomas L. Kundert

[57] ABSTRACT

The Display for Advanced Research and Training (DART), a wrap-around display system for presenting out-the-window visual imagery in a flight simulator, is substantially improved by adding a helmet mounted display of modest field-of-view that displays only an area-of-interest view (HMAoI) The HMAoI display displays a modest field-of-view, high resolution image, according to the head position of a simulator pilot as determined by a helmet mounted position indicator, that replaces the lower resolution view provided by the DART for the same image. The corresponding DART image is not displayed to prevent displaying a confusing view. The remaining DART display provides a peripheral view for a simulator pilot. The imagery provided through the HMAoI may be a two part image comprising a very high resolution central image surrounded by a lower, but still higher than the DART, resolution image.

8 Claims, 1 Drawing Sheet

HELMET MOUNTED AREA OF INTEREST (HMAOI) FOR THE DISPLAY FOR ADVANCED RESEARCH AND TRAINING (DART)

RIGHTS OF THE GOVERNMENT

The invention described herein may be manufactured and used by or for the Government of the United States for all governmental purposes without the payment of any royalty.

CROSS-REFERENCE TO RELATED APPLICATIONS

This application is a continuation-in-part of application Ser. No. 07/609,295, filed Nov. 5, 1990, now U.S. Pat. 5,137,450, issued Aug. 11, 1992.

BACKGROUND OF THE INVENTION

The present invention relates generally to flight simulators, and more particularly to an improvement to wrap-around display systems for presenting out-the-window visual imagery in a flight simulator.

A critical requirement for realistic flight simulation is that the video display provide a complete field-of-regard (the range of views available to a pilot from an aircraft cockpit by moving about his or her head). Other important requirements include a wide instantaneous field-of-view (the range of views available to a pilot at any instant while holding still his or her head), high contrast and high resolution. All of these requirements should be obtained, of course, with a compact structure and at low cost.

U.S. Pat. No. 51,137,450, "Display for Advanced Research and Training (DART) for Use in a Flight Simulator and the Like," which description is incorporated by reference into this description as though fully rewritten, describes a new compact visual display system for flight simulators that combines compactness with wide field-of-regard, wide field-of-view, reasonable resolution, high brightness, excellent contrast and low cost. Before the DART, the prior art of large radius domes and similar systems, in order to achieve an infinity display effect which, until the DART, was believed necessary for a successful flight simulator, had to compromise for each system various combinations of wide field-of-regard, wide field-of-view, resolution, brightness, contrast and low cost.

As described in the DART patent, even the more modern Fiber Optic Helmet Mounted Displays (FOHMD), with their excellent brightness, contrast and resolution, are nearly as expensive as domes and cannot deliver a wide instantaneous field-of-view.

Unfortunately, even the original DART, while a great improvement over prior art dome and FOHMD imagery systems, is not a complete solution to the problem of providing an as realistic as possible display for a flight simulator or similar apparatus. The resolution delivered by the DART is insufficient to provide aircrews with the visual acuity required for target acquisition and aspect and for the identification cues needed for the most visually demanding Air-to-Air and Air-to-Ground tasks. What the DART does best is provide the peripheral vision cues needed for altitude and orientation maintenance and perception of velocity from flow vector cues.

Thus it is seen that there is a need for an improvement to the DART, or similar wide field-of-view, reasonable resolution, display systems for flight simulators, that adds the high resolution needed for simulating the most visually demanding tasks while retaining the compactness, wide field-of-regard, wide field-of-view, high brightness, excellent contrast, low cost and other advantages of the DART.

It is, therefore, a principal object of the present invention to provide an improvement to the DART, or similar display systems, that adds high resolution at the continuously changing area-of-interest, or foveal, view of the display system.

It is a feature of the present invention that it combines in one display system the best features of the DART and of Helmet Mounted Display Systems.

It is an advantage of the present invention that it uses a simpler, lighter weight and less costly modification of more conventional Helmet Mounted Displays (HMDs) called a Helmet Mounted Area of Interest (HMAoI) display.

These and other objects, features and advantages of the present invention will become apparent as the description of certain representative embodiments proceeds.

SUMMARY OF THE INVENTION

The present invention augments the Display for Advanced Research and Training (DART) to add high resolution at the constantly changing area-of-interest of the display system. The unique discovery of the present invention is that the high resolution capability of a helmet mounted display can be inexpensively added to the DART by adding a Helmet Mounted Display (HMD) of modest field-of-view (FOV), called a Helmet Mounted Area of Interest (HMAoI) display. The simple optics for an HMD of modest FOV can be made for much less than the complicated optics required on conventional Fiber Optic Helmet Mounted Displays (FOHMD).

Another unique discovery of the present invention is that the use of a totally separate higher resolution area of interest display from the lower resolution peripheral display, instead of, as in the prior art, displaying the higher resolution image on the same display surface as the lower resolution display, has the additional advantage of obscuring any defects which might be inherent in the lower resolution display, so that the overall display is better, in effect, than the sum of its parts.

Accordingly, the present invention is directed to a compact visual display system for use as part of a vehicle simulator operated by an intended simulator pilot having a design eyepoint, comprising a plurality of flat rear-projection screens, wherein each screen has the shape of a pentagon, wherein the screens are joined along their edges to make a partial enclosure having the outside shape of a partial dodecahedron, and wherein each rear-projection screen is positioned less than about 3.5 feet across an optically unmodified space from the design eyepoint for the intended simulator pilot, a plurality of first video projectors for projecting beams of video images, each first video projector mounted outside the partial dodecahedron enclosure and aimed to project its video beam toward a rear-projection screen, and a helmet mounted display for wear by the intended simulator pilot, wherein the helmet mounted display focuses its display at the same distance from the design eyepoint as one of the rear-projection screens. The compact visual display system may further comprise one or more second video projectors for projecting beams of video images through the helmet mounted display to the design eyepoint of the intended simulator pilot, means for determining the head position of the intended simulator pilot, and means for generating a plurality of video images for transmitting to the first and second video projectors, wherein the video image generating means provides appropriate images to the second video projectors according to the determined head position of the intended simulator pilot, and wherein the video image generating means modifies the video images sent to the first video projectors to remove on any rear-projection screen the video images being sent to the first video projectors. The video image generating means may blend the video images sent to the first and second video projectors so that the video images sent to the second video projectors blends inconspicuously with the not removed images sent to the first video projectors. The video image generating means may provide two images to the second video projectors, a first image of higher resolution than the images sent to the first video projectors and a second image of even higher resolution. The first image may surround the second image.

The invention is also directed to a visual display system for use as part of a vehicle simulator operated by an intended simulator pilot having a design eyepoint, comprising a projection visual display system having one or more projection screens optically positioned at a first distance from the design eyepoint for the intended simulator pilot, and a helmet mounted display for wear by the intended simulator pilot, wherein the helmet mounted display focuses its display at the first distance from the design eyepoint. The first distance may be less than infinity. The visual display system may further comprise means for determining the head position of the intended simulator pilot, means for providing to the helmet mounted display appropriate images according to the determined head position of the intended simulator pilot, and means for removing from the video images shown on the projection screens the video images provided to the helmet mounted display. The video images provided to the helmet mounted display may be blended with the not removed images shown on the projection screens. The video image providing means for the helmet mounted display may provide two images to the helmet mounted display, a first image of higher resolution than shown on the projection screens and a second image of even higher resolution. The first image may surround the second image.

DESCRIPTION OF THE DRAWINGS

The present invention will be more clearly understood from a reading of the following detailed description in conjunction with the accompanying drawings wherein.

DETAILED DESCRIPTION

Figure 1:
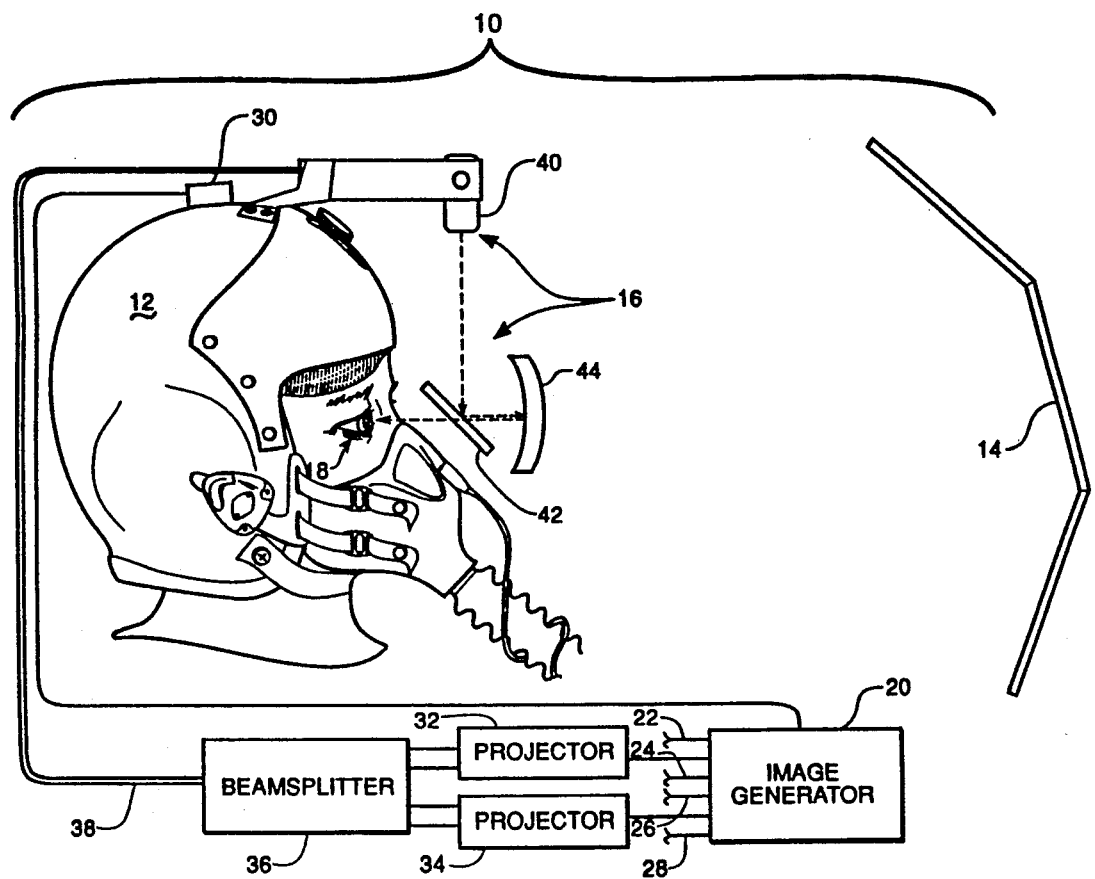
FIG. 1 is a schematic side view of a visual display system made according to the teachings of the present invention showing a simulator pilot viewing both a lower resolution wide field-of-regard and wide instantaneous field-of-view DART and a higher resolution, modest field-of-view HMAoI display; and, FIG. 2 is a simulator pilot's eye view of the resulting combination display of a DART and an HMAoI display showing a two part resolution display for the HMAoI.

Referring now to FIG. 1 of the drawings, there is shown a schematic side view of a visual display system 10 made according to the teachings of the present invention showing a simulator pilot 12 viewing both a lower resolution wide field-of-regard and wide instantaneous field-of-view DART display surface 14 and a higher resolution, modest field-of-view HMAoI display 16.

DART display surface 14 is located about 3.5 feet from the eye 18 of simulator pilot 12. An image generator 20 is used to create the images displayed on the different panels of DART display surface 14 as described in the earlier referenced DART Patent. Video channels 22, 24, 26 and 28 lead to various video projectors (not shown) for projecting different views onto the rear projection screens of DART display surface 14 according to the teachings of the DART patent. The actual number of video channels may be more or fewer than shown. A helmet mounted head tracker, or position indicator, 30 is connected to image generator 20 so that the images sent out over the different video channels can be changed, in combination with a video switcher (not shown), to display an appropriate view on those display panels then within the instantaneous field-of-view of simulator pilot 12.

The HMAoI display 16 of the present invention adds two additional video projectors 32 and 34 to the video projectors used for the DART display. Video projector 32, which may be a Barcodata 600 as has been used for the DART display, modified with dichroic based combining optics in order to inject the imagery from the red, green and blue cathode ray tubes down one optical path, receives from image generator 20 a mini-raster high resolution video image of the area-of-interest view of simulator pilot 12, as determined from the information received from position sensor 30. Video projector 34 receives an intermediate resolution (between that sent to projector 32 and that sent out over channels 22, 24, 26 and 28) video image of the area-of-interest. The two images from video projectors 32 and 34 are optically combined by a beamsplitter 36 and sent over a fiber optic channel 38, in this embodiment a 16–18 mm format coherent fiber optic bundle, to a projector 40. Projector 40 are shown mounted on the top of the helmet of simulator pilot 12 for clarity, but might also be positioned at chin level to reduce peripheral and look up vision obstruction for simulator pilot 14. Projector 40 sends the combined video image to a partially-silvered mirror 42 which reflects part of the combined image to a partially-silvered lens 44. Partially-silvered, or partially reflective, lens 44 collimates (or focuses) the combined video image to the same 3.5 foot radius distance the design eyepoint for the simulator pilot is placed from DART display surface 14 and sends it to eye 18.

In this embodiment, mirror 42 and lens 44 are both 25% reflective, so that the overall transmissiveness of the optics is as high as possible, preferably about 50%.

HMAoI display 16 does not have to be configured exactly as shown. Partially-silvered mirror 42, for example, may be angled off to one side so that the combined video image does not have to make pass back through mirror 42 after reflecting from partially-silvered lens 44. Those with skill in the art of the invention will readily see other configurations that take advantage of the fact that the helmet mounted display need provide only a modest field-of-view.

Figure 2:
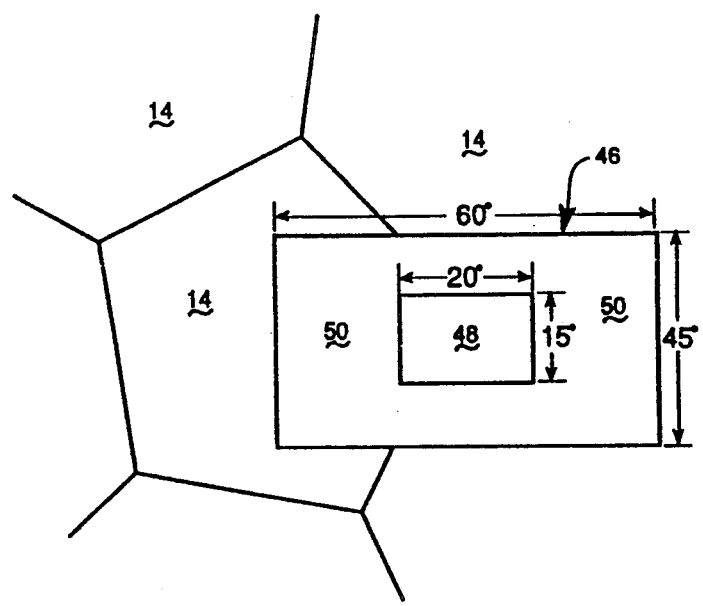

FIG. 2 shows an example outline of a view 46 seen by simulator pilot 12 when looking through HMAoI display 16 to DART display surface 14. In this embodiment, the high resolution image 48 from video projector 32 is in the center of view 46 surrounded by the intermediate resolution image 50 from video projector 34. Image generator 20 removes the image sent to that part of DART display surface 14 that lies behind HMAoI view 46 to make a video hole and avoid presenting a confusing image to simulator pilot 12. Image generator 20 further blends the images shown by HMAoI display 16 and on DART display surface 14 so that the HMAoI and DART images combine inconspicuously. A head-up-display presented in a forward window of a DART would not be removed when the HMAoI imagery was superimposed over it so that the images would combine to form a scene more similar to what would occur in an actual aircraft.

FIG. 2 shows an instantaneous field-of-view of about 60% for intermediate resolution image 50 and about 20% for high resolution image 48. Other appropriate fields-of-view may be about 50% for the intermediate resolution image and about one-half that for the high resolution image.

The images from HMAoI display 16 obscure both the edges between the edge facets of DART display surface 14 and any other imperfections in the DART display.

Preferably, the imagery for HMAoI display 16 will be fed to both eyes so that only one projector, or set of projectors, and one image generation scene, is needed to supply the imagery to both eyes.

It will be seen by those with skill in the field of art of the invention that the display system as shown may be modified in a variety of advantageous ways. For example, the background imagery may be made stereoscopic by using video switching techniques as described in the DART patent. The helmet mounted display imagery could also be stereo and it might then be acceptable if the background imagery was not. The helmet mounted display and background scenes could be run at different video rates to reduce image generation costs and optimize the display to human visual system requirements. Eye tracking may be used to servo the high resolution area-of-interest on the helmet mounted display to the actual point-of-gaze of the pilot or other aircrew member to maximize the effectiveness of the area-of-interest display.

The disclosed improvement to wrap-around display systems successfully demonstrates the use of a separate area-of-interest display in combination with a DART supplying background imagery. By combining both display concepts, the high resolution, modest field-of-view provided by a helmet mounted display, and the reasonable resolution, large field-of-view provided by the DART, their respective strengths complement each other and result in a balanced presentation yielding both high resolution and total instantaneous field-of-view, while still keeping the cost affordable for even networked systems. Although the disclosed system is specialized, its teachings will find application in other areas where it may be cost prohibitive to modify otherwise successful systems, particularly display systems, to provide high performance features not inherent in their design. Its teachings will also, of course, find application to other dome or similar displays of effective focal lengths from infinity on down.

In the following claims, the term optically positioned means the position at which an object optically appears to be positioned, regardless of its actual position in space.

It will be seen by those with skill in the field of the invention that the system as shown may be assembled in a variety of other ways, and the video projectors arranged in other configurations. For example, a more recent construction is configured so that different cockpits may be wheeled in and out from the rear or the partial dodecahedron. Other modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A compact visual display system for use as part of a vehicle simulator operated by an intended simulator pilot having a design eyepoint comprising:
    (a) a plurality of flat rear-projection screens, wherein each screen has the shape of a pentagon, wherein the screens are joined along their edges to make a partial enclosure having the outside shape of a partial dodecahedron, and wherein each rear-projection screen is positioned less that about 3.5 feet across an optically unmodified space from the design eyepoint for the intended simulator pilot;
    (b) a plurality of first video projectors for projecting beams of video images, each first video projector mounted outside the partial dodecahedron enclosure and aimed to project its video beam toward a respective rear-projection screen;
    (c) a helmet mounted display for wear by the intended simulator pilot, wherein the helmet mounted display focuses its display at the same distance from the design eyepoint as one of the rear-projection screens;
    (d) at least one second video projector for projecting a beam of video images through the helmet mounted display to the design eyepoint of the intended simulator pilot;
    (e) means for determining the head position of the intended simulator pilot; and
    (f) means for generating a plurality of video images for transmitting to the first and second video projectors, wherein the video image generating means provides appropriate images to the second video projector according to the determined head position of the intended simulator pilot, wherein the video image generating means provides an image to the second video projector of higher resolution than shown on the rear-position screens, and wherein the video image generating means modifies the video images sent to the first video projectors to remove on any rear-projection screen the video images being sent to the first video projector.

2. The compact visual display system according to claim 1, wherein the video image generating means blends the video images sent to the first and second video projectors so that the video images sent to the second video projectors blends inconspicuously with the not removed images sent to the first video projectors.

3. A compact visual display system for use as part of a vehicle simulator operated by an intended simulator pilot having a design eyepoint, comprising:
    (a) a plurality of flat rear-projection screens, wherein each screen has the shape of a pentagon, wherein the screens are joined along their edges to make a partial enclosure having the outside shape of a partial dodecahedron, and wherein each rear-projection screen is positioned less than about 3.5 feet across an optically unmodified space from the design eyepoint for the intended simulator pilot;

(b) a plurality of first video projectors for projecting beams of video images, each first video projector mounted outside the partial dodecahedron enclosure and aimed to project its video beam toward a respective rear-projection screen;

(c) a helmet mounted display for wear by the intended simulator pilot, wherein the helmet mounted display focuses its display at the same distance from the design eyepoint as one of the rear-projection screens;

(d) at least one second video projector for projecting a beam of video images through the helmet mounted display to the design eyepoint of the intended simulator pilot;

(e) means for determining the head position of the intended simulator pilot; and, (f) means for generating a plurality of video images for transmitting to the first and second video projectors, wherein the video image generating means provides appropriate images to the second video projector according to the determined head position of the intended simulator pilot, and wherein the video image generating means modifies the video images sent to the first video projectors to remove on any rear-projection screen the video images being sent to the first video projectors;

(g) wherein the video image generating means provides two images to the second video projector, a first image of higher resolution that the images sent to the first video projectors and a second image of even higher resolution.

4. The compact visual display system according to claim 3, wherein the first image surrounds the second image.

5. A visual display system for use as part of a vehicle simulator operated by an intended simulator pilot having a design eyepoint comprising:

(a) a projection visual display system having at least one projection screen optically positioned at a first distance from the design eyepoint for the intended simulator pilot; and (b) a helmet mounted display for wear by the intended simulator pilot, wherein the helmet mounted display focuses its display at the first distance form the design eyepoint;

(c) means for determining the head position of the intended simulator pilot;

(d) means for providing to the helmet mounted display appropriate video images according to the determined head position of the intended simulator pilot, wherein the video image providing means provides an image to the helmet mounted display of higher resolution than shown on the projection screens;

(e) means for removing from the video images shown on the projection screen the video images provided to the helmet mounted display.

6. The visual display system according to claim 5, wherein the video images provided to the helmet mounted display are blended with the not removed images shown on the projection screens.

7. A visual display system for use as part of a vehicle simulator operated by an intended simulator pilot having a design eyepoint, comprising:

(a) a projection visual display system having at least one projection screen optically positioned at a first distance from the design eyepoint for the intended simulator pilot;

(b) a helmet mounted display for wear by the intended simulator pilot, wherein the helmet mounted display focuses its display at the first distance from the design eyepoint;

(c) means for determining the head position of the intended simulator pilot;

(d) means for providing to the helmet mounted display appropriate video images according to the determined head position of the intended simulator pilot;

(e) means for removing from the video images shown on the projection screen the video images provided to the helmet mounted display;

(f) wherein the video image providing means for the helmet mounted display provides two images to the helmet provided display, a first image of higher resolution than shown on the projection screens and a second image of even higher resolution.

8. The visual display system according to claim 7, wherein the first image surrounds the second image.

* * * * *